US008319644B2

(12) United States Patent
Shimazaki (10) Patent No.: US 8,319,644 B2
(45) Date of Patent: Nov. 27, 2012

(54) RFID SYSTEM AND RFID TAG READING METHOD

(75) Inventor: Takeshi Shimazaki, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 284 days.

(21) Appl. No.: 12/749,560

(22) Filed: Mar. 30, 2010

(65) Prior Publication Data

US 2010/0265065 A1  Oct. 21, 2010

(30) Foreign Application Priority Data

Apr. 15, 2009  (JP) .................................. 2009-099087
Feb. 25, 2010  (JP) .................................. 2010-040518

(51) Int. Cl.
*G08B 13/14* (2006.01)
*G05B 19/00* (2006.01)
*G06Q 30/00* (2006.01)

(52) U.S. Cl. .................. 340/572.1; 340/572.3; 340/5.92; 235/385

(58) Field of Classification Search .................. 340/541, 340/572.1–572.9, 10.1, 5.92; 235/375–385
See application file for complete search history.

(56) References Cited

U.S. PATENT DOCUMENTS

| | | | |
|---|---|---|---|
| 5,886,634 A * | 3/1999 | Muhme ........................ 340/572.1 |
| 5,887,176 A * | 3/1999 | Griffith et al. ................ 713/320 |
| 5,973,613 A * | 10/1999 | Reis et al. .................... 340/7.23 |
| 6,232,877 B1 * | 5/2001 | Ashwin ........................ 340/572.1 |
| 6,313,745 B1 * | 11/2001 | Suzuki ........................ 340/572.1 |
| 6,961,000 B2 * | 11/2005 | Chung ........................ 340/572.1 |
| 7,183,913 B2 * | 2/2007 | Hughes et al. ............. 340/568.1 |
| 7,212,097 B2 * | 5/2007 | Yoshikawa et al. .......... 340/5.28 |
| 7,271,727 B2 * | 9/2007 | Steeves ....................... 340/572.7 |
| 7,283,051 B2 * | 10/2007 | Sakamoto et al. ......... 340/572.1 |
| 7,307,533 B2 * | 12/2007 | Ishii ............................ 340/572.1 |
| 7,317,377 B2 * | 1/2008 | Galperin et al. ............. 340/5.64 |
| 7,319,395 B2 * | 1/2008 | Puzio et al. ................ 340/572.1 |
| 7,365,643 B1 * | 4/2008 | Cole ........................ 340/539.11 |
| 7,557,712 B2 * | 7/2009 | Shelton et al. ............. 340/572.4 |
| 7,737,824 B2 * | 6/2010 | Aikawa et al. ............... 340/10.4 |
| 7,954,707 B2 * | 6/2011 | Shimizu et al. ............... 235/380 |
| 8,102,238 B2 * | 1/2012 | Golander et al. ............. 340/5.2 |

(Continued)

FOREIGN PATENT DOCUMENTS

JP  09-325993  12/1997
(Continued)

OTHER PUBLICATIONS

Japanese Office Action for Application No. 2010-040518 mailed on Feb. 22, 2011.

*Primary Examiner* — Benjamin C Lee
*Assistant Examiner* — Adam Carlson
(74) *Attorney, Agent, or Firm* — Turocy & Watson, LLP (57) ABSTRACT

Tag data stored in a specific RFID tag is stored in a specific-data storing unit. Tag data is read from an RFID tag present in a communication area by an RFID reader through radio communication according to detection of a specific object by a sensor for detecting the object. When tag data same as the tag data stored in the specific-data storing unit is not included in the tag data read by the RFID reader, the read tag data is transmitted to a host apparatus.

6 Claims, 5 Drawing Sheets

U.S. PATENT DOCUMENTS

| | | | |
|---|---|---|---|
| 8,115,633 B2 * | 2/2012 | Puskala et al. | 340/572.1 |
| 2008/0231451 A1 * | 9/2008 | Kamel | 340/572.1 |
| 2009/0207023 A1 * | 8/2009 | Kushida et al. | 340/572.1 |

FOREIGN PATENT DOCUMENTS

| | | |
|---|---|---|
| JP | 11-175857 | 7/1999 |
| JP | 2001-249987 | 9/2001 |
| JP | 2004-334367 | 11/2004 |
| JP | 2005-011083 | 1/2005 |
| JP | 2005-309601 | 11/2005 |
| JP | 2006-259800 | 9/2006 |
| JP | 2007-002355 | 1/2007 |
| JP | 2007-115152 | 5/2007 |

* cited by examiner

RFID SYSTEM AND RFID TAG READING METHOD

CROSS-REFERENCE TO RELATED APPLICATION

This application is based upon and claims the benefit of priority from the prior Japanese Patent Applications No. 2009-099087, filed Apr. 15, 2009; and No. 2010-040518, filed Feb. 25, 2010 the entire contents of both which are incorporated herein by reference.

TECHNICAL FIELD

The present invention relates to an RFID (Radio Frequency Identification) system including an RFID reader configured to read tag data from RFID tags present in a communication area through radio communication and an RFID tag reading method using the RFID reader.

BACKGROUND

Conventionally, an RFID system is used in which, as in a system disclosed in JP-A-2007-2355, RFID tags having stored therein information concerning commodities are attached to the commodities and tag data stored in the RFID tags are read by an RFID reader through radio communication in a distribution process and used for commodity management.

There is also known an RFID system in which RFID tags having stored therein commodity information and the like are attached to clothes sold as commodities and an RFID reader, a communication area of which is in a fitting room, tries to read an RFID tag according to detection of a customer by a human sensor set in the fitting room and transmits read tag data to a server apparatus. If this system is used, by viewing the tag data transmitted to the server apparatus, it is possible to grasp tendency and the like of commodities tried on.

When the RFID system is applied to the fitting room, the RFID reader tries reading even when the human sensor detects a store clerk. Therefore, after a customer tries clothes on, the RFID reader tries reading even when the store clerk enters the fitting room to put away the commodities left by the customer. As a result, RFID tags of the commodities left by the customer are read and stored in the server apparatus. This prevents collection of accurate data.

As explained above, even when it is unnecessary to read RFID tags, the RFID reader tries reading and stores read data in a host apparatus or the like. This problem could also occur in other RFID systems.

SUMMARY

The present invention is devised in view of the circumstances and it is an object of the present invention to provide an RFID system and an RFID tag reading method for supporting correct information collection by preventing unnecessary data from being stored as management targets.

According to an aspect of the present invention, there is provided an RFID system including: a sensor configured to detect a specific object; and an RFID reader configured to read tag data from an RFID tag present in a communication area through radio communication according to detection of the object by the sensor, wherein the RFID reader includes: a specific-data storing unit configured to store tag data of a specific RFID tag; and a control unit configured to transmit, when tag data coinciding with the tag data stored in the specific-data storing unit is not included in the tag data read from the RFID tag present in the communication area, the read tag data to a host apparatus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION

First Embodiment

An embodiment of the present invention is explained below with reference to the accompanying drawings. This embodiment is an example in which the present invention is applied to an RFID system provided for the purpose of collecting data of commodities carried into a fitting room set in an apparel store.

Figure 1:
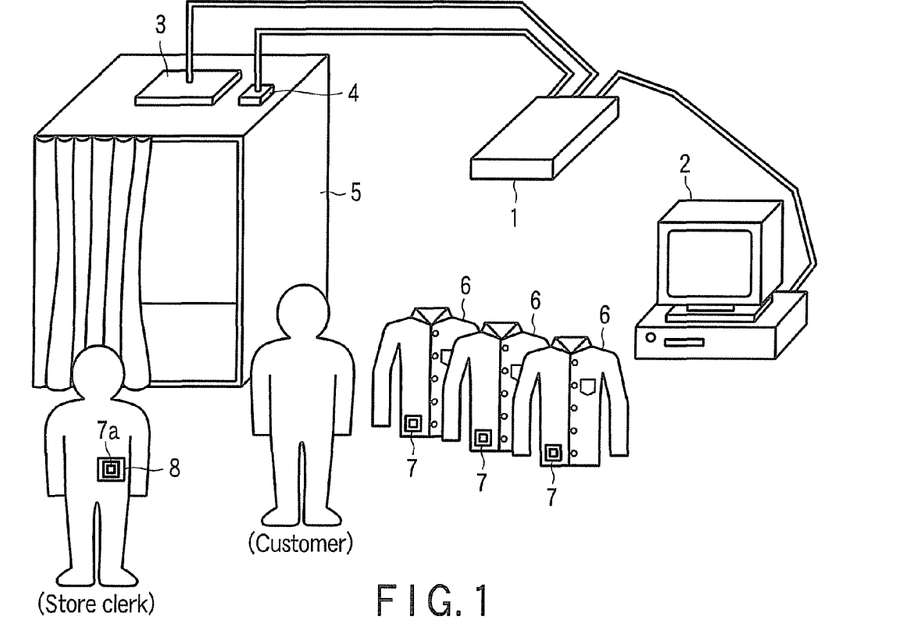
FIG. 1 is a schematic diagram of an RFID system according to a first embodiment of the present invention.
Figure 2:
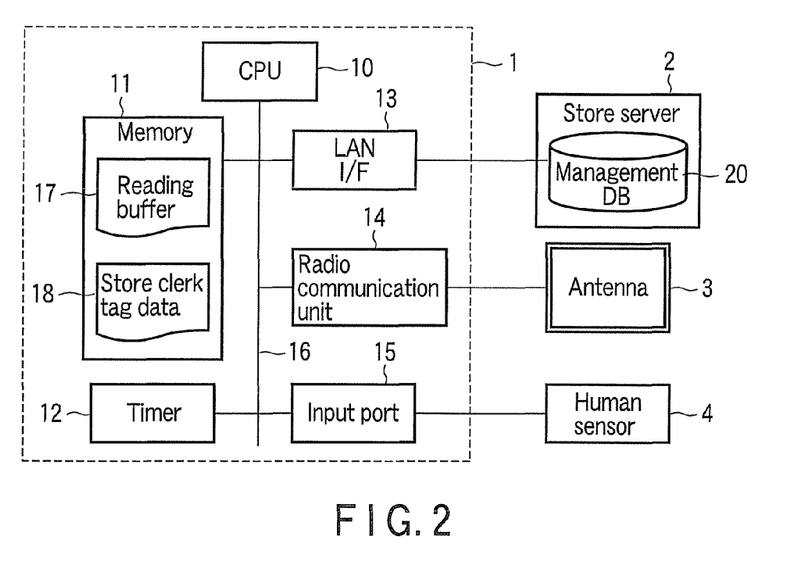
FIG. 2 is a block diagram of a control circuit for the RFID system according to the embodiment.

FIG. 1 is a schematic diagram of the configuration of the RFID system according to this embodiment. FIG. 2 is a block diagram of a control circuit for the RFID system. The RFID system includes an RFID reader 1, a store server 2 connected to the RFID reader 1, an antenna 3, and a human sensor 4. A fitting room (a room section) 5 for customers to try commodities on is provided in a store in which the RFID system is set. RFID tags 7 including IC chips and antennas are attached to commodities 6 such as clothes sold in the store. The IC chips have stored therein commodity data of the commodities 6. A customer can carry any one of the commodities 6 into the fitting room 5 and try the commodity 6 on by notifying a store clerk that the customer uses the fitting room 5.

As shown in FIG. 2, the RFID reader 1 includes a CPU (Central Processing Unit) 10 functioning as a core of control. A memory 11, a timer 12, a LAN interface (I/F) 13, a radio communication unit 14, and an input port 15 are connected to the CPU 10 via a bus line 16 including an address bus or a data bus to configure a control circuit for the RFID reader 1.

The memory 11 includes a ROM (Read Only Memory) or a RAM (Random Access Memory), has stored therein fixed data such as an operation program for the RFID reader 1, and forms a storage area for various kinds of work.

The timer 12 measures predetermined time according to a command from the CPU 10.

The LAN interface 13 controls data communication with the store server 2.

The radio communication unit 14 controls radio communication with the RFID tag 7 of the commodity 6, which is carried into the fitting room 5, performed by using the antenna 3.

The input port 15 captures a signal output from the human sensor 4 and notifies the CPU 10 of the signal.

The antenna 3 and the human sensor 4 are attached to the ceiling of the fitting room 5 as shown in FIG. 1.

The antenna 3 transmits, on the basis of a high-frequency signal output from the radio communication unit 14 of the RFID reader 1, a reading radio wave having directivity in the inner direction of the fitting room 5. The RFID tag 7, which receives the reading radio wave, performs back-scatter modulation for changing a reflection amount of the high-frequency signal with information stored in the IC of the RFID tag 7 and transmits, as a response radio wave, a signal generated as a result of the back-scatter modulation. The antenna 3, which receives the response radio wave, generates a high-frequency signal on the basis of the response radio wave and outputs the high-frequency signal to the radio communication unit 14. The radio communication unit 14 demodulates the high-frequency signal output from the antenna 3 into tag data of the RFID tag 7.

The human sensor 4 optically detects the presence of a person in the fitting room 5 that is a communication range of the RFID reader 1. When a customer, a store clerk, or the like enters the fitting room 5, the human sensor 4 detects the presence of the person and transmits a signal to the input port 15 of the RFID reader 1.

The store server 2 is set in an office or the like of the store and includes a management database (a read-data storing unit) 20 in which various kinds of information concerning the management of the store are stored. An administrator of the store server 2 can view data managed in the management database 20 by operating a predetermined input device.

The store clerk of the store carries an identification card 8 incorporating an RFID tag 7a. Like the tag data of the RFID tag 7 attached to the commodity 6, tag data stored in the RFID tag 7a incorporated in the identification card 8 can be read by the RFID reader 1 and the antenna 3.

A reading buffer 17 and a store clerk tag data file (a specific-data storing unit) 18 are provided in the memory 11 of the RFID reader 1. The tag data read from the RFID tag 7 is stored in the reading buffer 17. The tag data stored in RFID tags 7a of identification cards 8 carried by store clerks are stored in the store clerk tag data file 18.

The operation of the RFID system configured as explained above is explained below.

Figure 3:
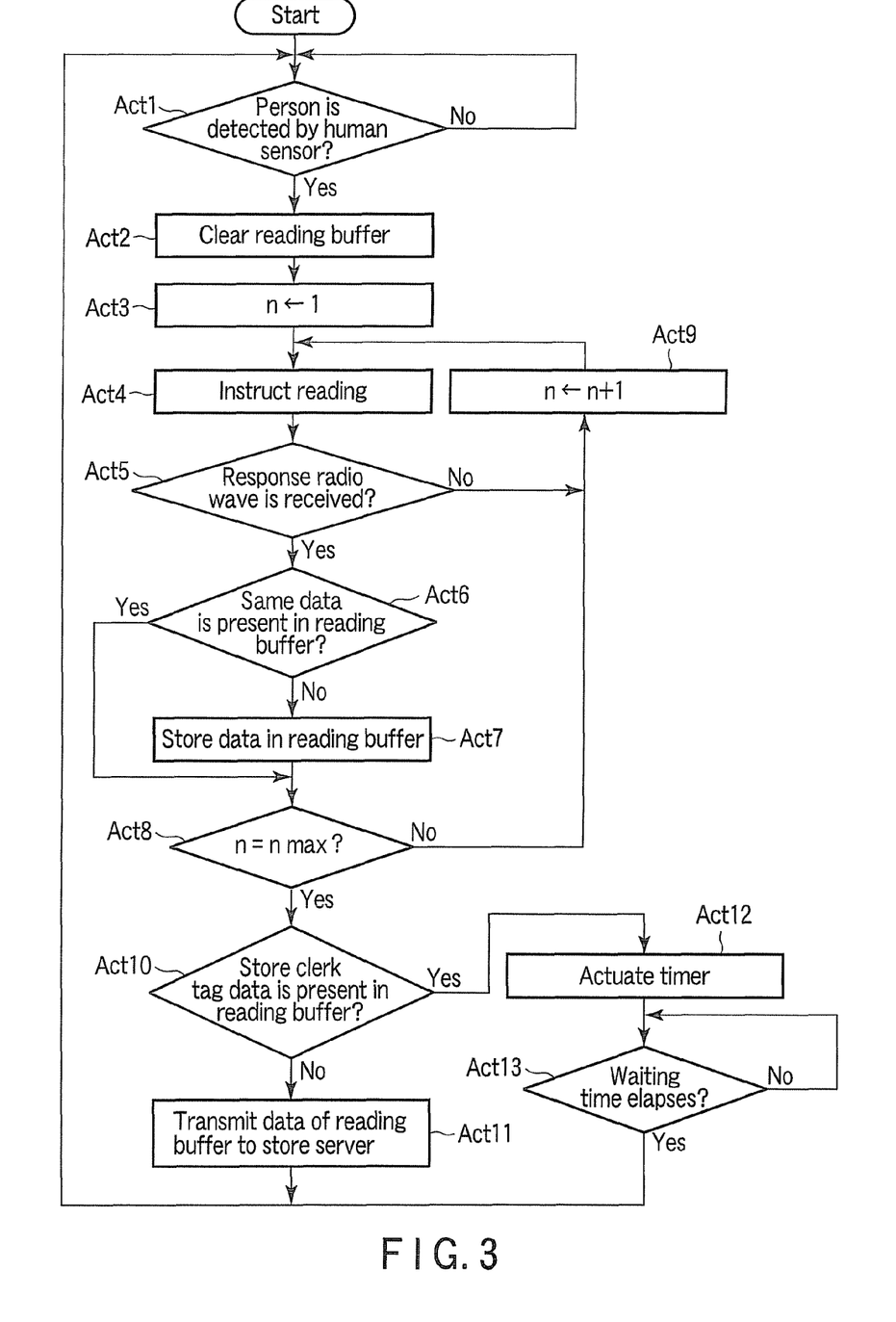
FIG. 3 is a flowchart for explaining processing executed by a CPU of an RFID reader in the embodiment.

The CPU 10 as a control unit of the RFID reader 1 is programmed to operate according to a flowchart shown in FIG. 3 when electric power is supplied to the RFID system and the RFID system is in an operation state. The operation of the RFID system is explained below with reference to FIG. 3.

First, the CPU 10 determines, on the basis of an input from the input port 15, whether the human sensor 4 detects the presence of a person in the fitting room 5 (Act 1). This processing is continued until the human sensor 4 detects the presence of a person (No in Act 1).

When a customer or a store clerk enters the fitting room 5, the human sensor 4 detects the presence of the person and transmits a signal to the input port 15. If the signal is received (Yes in Act 1), the CPU 10 clears data stored in the reading buffer 17 (Act 2) and initializes a value of a counter n (n is a positive integer) formed in the memory 11 to "1" (Act 3).

Subsequently, the CPU 10 instructs the radio communication unit 14 to read an RFID tag (Act 4). In response to the instruction, the radio communication unit 14 outputs a high-frequency signal for reading an RFID tag to the antenna 3. The antenna 3, which receives the input of the high-frequency signal, transmits a reading radio wave based on the signal into the fitting room 5. After instructing the radio communication unit 14 to read an RFID tag, the CPU 10 determines whether a response radio wave is received (Act 5).

When the commodity 6 is carried into the fitting room 5, the RFID tag 7 attached to the commodity 6 receives the reading radio wave and returns a response radio wave through back-scatter modulation. When the antenna 3 receives the response radio wave from the RFID tag 7, the antenna 3 outputs a high-frequency signal based on the response radio wave to the radio communication unit 14. The radio communication unit 14 demodulates the high-frequency signal to generate tag data.

When the tag data is generated by the radio communication unit 14 in this way, the CPU 10 determines that the response radio wave is received (Yes in Act 5) and determines whether tag data same as the generated tag data is stored in the reading buffer 17 (Act 6). If the same tag data is not stored in the reading buffer 17 (No in Act 6), the CPU 10 stores the tag data in the reading buffer 17 (Act 7). On the other hand, if the same tag data is stored in the reading buffer 17 (Yes in Act 6), since the RFID tag 7 related to the tag data is already read, the CPU 10 discards the tag data without storing the tag data in the reading buffer 17.

After storing the tag data generated from the response radio wave in the reading buffer 17 or discarding the tag data in this way, the CPU 10 determines whether a value of the counter n reaches a number of times of reading trial n max set in advance (Act 8). If the value of the counter n does not reach the number of times of reading trial n max yet (No in Act 8), the CPU 10 increments the value of the counter n by one (Act 9) and instructs the radio communication unit 14 again to read an RFID tag (Act 4).

The trial of the reading of an RFID tag is repeated in this way. If the value of the counter n reaches the number of times of reading trial n max (Yes in Act 8), the CPU 10 determines whether tag data same as the tag data stored in the store clerk tag data file 18 is included in the tag data stored in the reading buffer 17 (Act 10).

If tag data same as the tag data stored in the store clerk tag data file 18 is not included in the tag data stored in the reading buffer 17 (No in Act 10), the CPU 10 transmits the tag data stored in the reading buffer 17 to the store server 2 via the LAN interface 13 (Act 11) and waits for detection of a person by the human sensor 4 again (Act 1). The store server 2, which receives the tag data transmitted from the RFID reader 1, stores and manages the tag data in a predetermined area of the management database 20.

On the other hand, if tag data same as the tag data stored in the store clerk tag data file 18 is included in the tag data stored in the reading buffer 17 (Yes in Act 10), the CPU 10 actuates the timer 12 to start measurement of a predetermined waiting time (Act 12) and waits for completion of the measurement of the waiting time (Act 13). If the measurement of the waiting time is completed (Yes in Act 13), the CPU 10 waits for detection of a person by the human sensor 4 again without transmitting the tag data stored in the reading buffer 17 to the store server 2 (Act 1). In this way, when the tag data stored in the store clerk tag data file 18 is read, transmission of tag data to the store server 2 is stopped until the waiting time elapses.

As explained above, in the RFID system according to this embodiment, reading of the RFID tag 7 by the RFID reader 1 is executed according to detection of entrance of someone into the fitting room 5 by the human sensor 4. If a customer carries the commodity 6 into the fitting room 5 to try the commodity 6 on, the RFID tag 7 attached to the commodity 6 is read and tag data of the RFID tag 7 is transmitted to the store server 2.

Thereafter, for example, when the customer exits the fitting room 5 leaving the commodity 6 tried on by the customer behind, a store clerk has to enter the fitting room 5 to put away the commodity 6. At this point, since the human sensor 4 detects the store clerk, reading of an RFID tag is executed by the RFID reader 1. However, in this case, the RFID tag 7a incorporated in an identification card carried by the store clerk is read together with the RFID tag 7 attached to the commodity 6. Since the tag data of the RFID tag 7a is stored in the store clerk tag data file 18, the tag data of the RFID tag 7 attached to the commodity 6 is not transmitted to the store server 2.

Specifically, since the tag data is transmitted to the store server 2 only when the customer tries the commodity 6 on and unnecessary tag data is not transmitted to the store server 2, it is possible to perform correction information collection.

Since the RFID reader 1 stands by for elapse of the predetermined waiting time after the tag data stored in the store clerk tag data file 18 is read, transmission of tag data to the store server 2 during the standby is stopped. Therefore, it is possible to surely stop transmission of unnecessary tag data to the store server 2 while the store clerk puts away the commodity 6 in the fitting room 5.

Second Embodiment

A second embodiment of the present invention is explained below with reference to the accompanying drawings.

In this embodiment, the store server 2 is caused to execute a part of the processing explained as being executed by the RFID reader 1 in the first embodiment. The overall configuration of an RFID system is the same as that shown in FIG. 1. A control circuit for the RFID reader 1 is the same as that shown in FIG. 2. Therefore, explanation of the RFID system and the control circuit is omitted.

Figure 4:
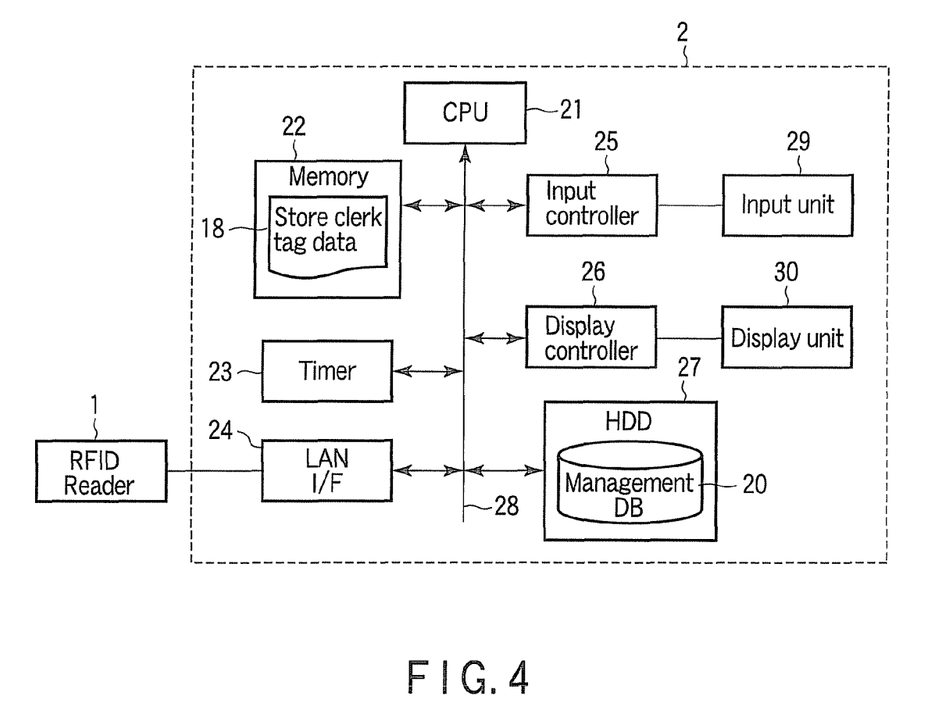
FIG. 4 is a block diagram of a control circuit for a store server according to a second embodiment of the present invention.

FIG. 4 is a block diagram of a control circuit for the store server 2.

The store server 2 includes a CPU 21 functioning as a core of control. A memory 22, a timer 23, a LAN interface 24, an input controller 25, a display controller 26, and a HDD (Hard Disk Drive) 27 are connected to the CPU 21 via a bus line 28 including an address bus or a data bus to configure the control circuit for the store server 2.

The memory 22 includes a ROM or a RAM and has stored therein an operation program for the store server 2 and the store clerk tag data file (the specific-data storing unit) 18. As in the first embodiment, the tag data stored in the RFID tags 7a of the identification cards 8 carried by the store clerks are stored in the store clerk tag data file 18.

The timer 23 measures predetermined time according to a command from the CPU 21.

The LAN interface 24 controls data communication with the RFID reader 1.

The input controller 25 captures an input signal output from an input unit 29 including a keyboard and a mouse and notifies the CPU 21 of the input signal.

The display controller 26 controls display of a display unit 30 including a LCD (Liquid Crystal Display).

The HDD 27 has stored therein a management database (a read-data storing unit) 20 including various kinds of information concerning the management of a store.

The operation of the RFID system according to this embodiment is explained below.

Figure 5:
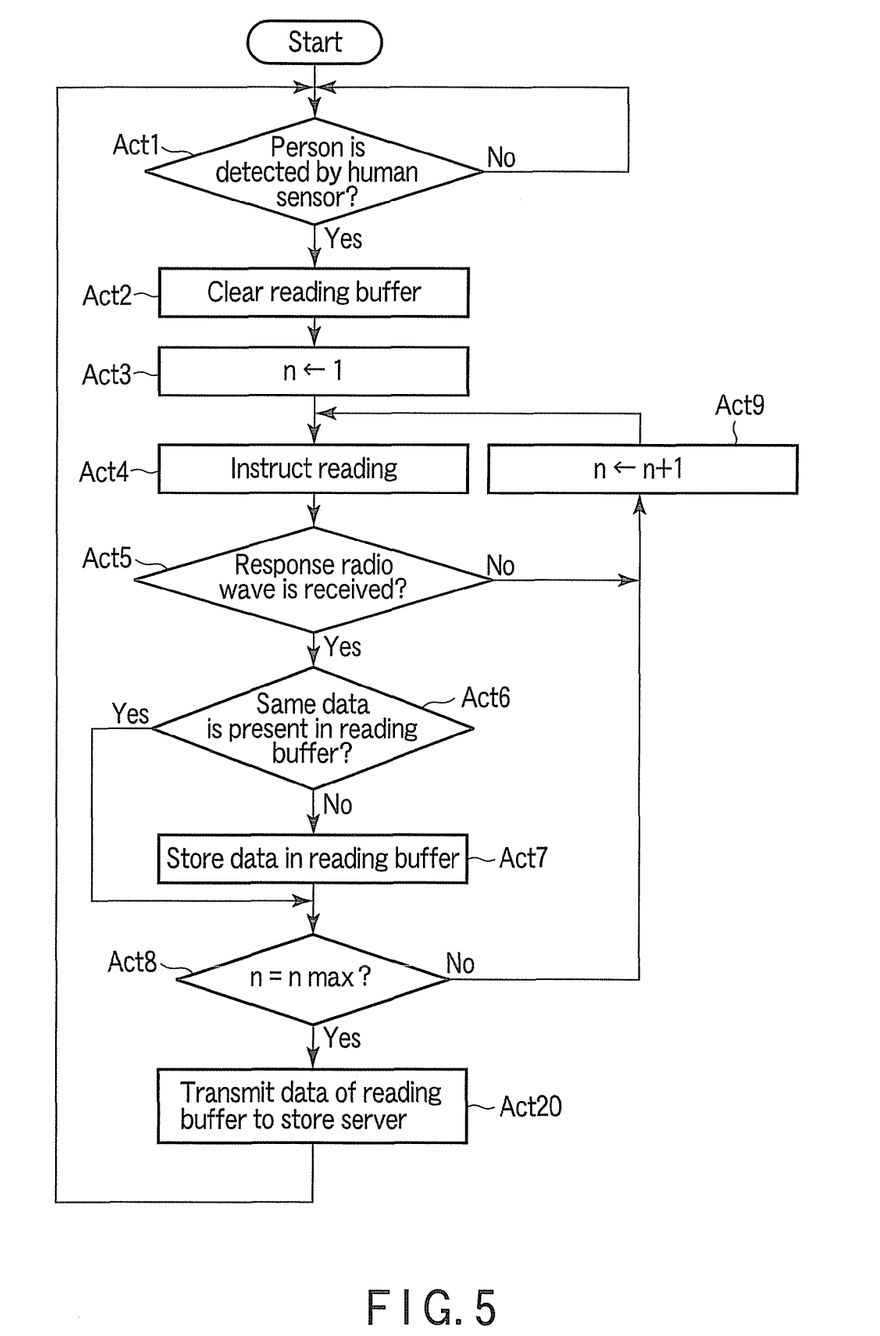
FIG. 5 is a flowchart for explaining processing executed by a CPU of an RFID reader in the embodiment.

The CPU 10 as a control unit of the RFID reader 1 is programmed to operate according to a flowchart shown in FIG. 5 when electric power is supplied to the RFID system and the RFID system is in an operation state. The operation of the RFID system is explained below with reference to FIG. 5.

In the flowchart, operation in Act 1 to Act 9 is the same as the operation explained with reference to FIG. 3. Specifically, according to detection of the presence of a person in the fitting room 5 by the human sensor 4, the CPU 10 performs reading of an RFID tag until a value of the counter n reaches the number of times of reading trial n max and stores tag data read in a series of operation in the reading buffer 17.

After performing the reading of an RFID tag until the value of the counter n reaches the number of times of reading trial n max, the CPU 10 transmits the tag data stored in the reading buffer 17 to the store server 2 via the LAN interface 13 (Act 20). Thereafter, the CPU 10 waits for detection of a person by the human sensor 4 again (Act 1).

The operation of the store server 2 is explained below. The CPU 21 as a control unit of the store server 2 is programmed to operate according to a flowchart shown in FIG. 6 when electric power is supplied to the RFID system and the RFID system is in an operation state. The operation of the RFID system is explained with reference to FIG. 6.

Figure 6:
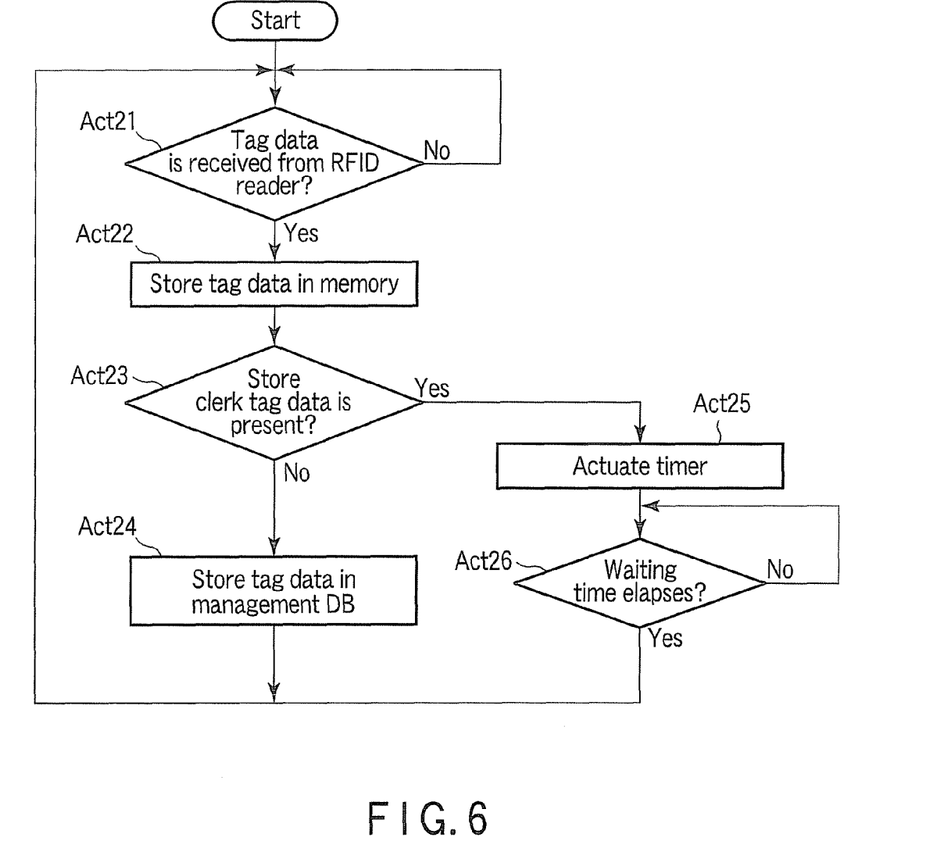
FIG. 6 is a flowchart for explaining processing executed by a CPU of the store server in the embodiment.

While the RFID system operates, the CPU 21 waits for tag data transmitted from the RFID reader 1 (Act 21). If the RFID reader 1 receives, though the LAN interface 24, the tag data transmitted by the RFID reader 1 in the operation in Act 20 shown in FIG. 5 (Yes in Act 21), the CPU 21 stores the received tag data in the memory 22 (Act 22).

After storing the tag data in the memory 22, the CPU 21 determines whether tag data same as the tag data stored in the store clerk tag data file 18 stored in the memory 22 is included in the tag data (Act 23).

If tag data same as the tag data stored in the store clerk tag data file 18 is not included in the tag data stored in the memory 22 in the operation in Act 22 (No in Act 23), the CPU 21 stores the tag data stored in the memory 22 in the operation in Act 22 in a predetermined storage area of the management database 20 (Act 24) and waits for reception of tag data from the RFID reader 1 again (Act 21).

On the other hand, if tag data same as the tag data stored in the store clerk tag data file 18 is included in the tag data stored in the memory 22 in the operation in Act 22 (Yes in Act 23), the CPU 21 actuates the timer 23 to start measurement of a predetermined waiting time (Act 25) and waits for completion of the measurement of the waiting time (Act 26). Even if tag data is received from the RFID reader 1 before the timer 23 finishes measuring the waiting time, the CPU 21 discards the received tag data without storing the tag data in the memory 22. In this way, when the tag data stored in the store clerk tag data file 18 is read, storage of the tag data in the memory 22 is suspended until the waiting time elapses.

If the timer 23 finishes measuring the waiting time (Yes in Act 26), the CPU 21 waits for reception of tag data from the RFID reader 1 again (Act 21).

As explained above, in the RFID system according to this embodiment, the store server 2 is caused to execute a part of the processing executed by the RFID reader 1 in the first embodiment. Even in such a case, when the RFID tag 7a incorporated in an identification card carried by a store clerk is read by the RFID reader 1 together with the RFID tag 7 attached to the commodity 6, tag data of the RFID tag 7 is not stored in the management database 20. Therefore, as in the first embodiment, it is possible to perform accurate information collection. Further, tag data read before the waiting time elapses after the tag data stored in the store clerk tag data file 18 is read is not stored in the management database 20. Therefore, as in the first embodiment, it is possible to surely stop transmission of unnecessary data to the store server 2 while a store clerk puts away the commodity 6 in the fitting room 5.

If the RFID reader 1 is prevented from performing special operation as in this embodiment, an existing RFID reader can be used when the RFID system is built. Therefore, it is possible to build the RFID system easily and at low cost.

Modification

In the explanation of the embodiments, the present invention is applied to the RFID system provided for the purpose of collecting data concerning trial wearing in an apparel store. However, it goes without saying that the present invention can also be applied to other RFID systems.

In the explanation of the embodiments, the optical human sensor 4 is adopted as means for detecting an object in the communication range of the RFID reader 1. However, the present invention is not limited to this and other sensors and the like may be used. As an example, in the RFID system explained in the embodiments, a mechanical sensor configured to detect weight may be attached on the floor of the fitting room 5 to detect entrance of a person into the fitting room 5 on the basis of a change in the weight. Besides, an optimum object detecting unit only has to be used according to, for example, a purpose of use of the RFID system to which the present invention is applied.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio-frequency identification (RFID) system comprising:
    a sensor configured to detect a person entering a fitting room; and
    an RFID reader configured to read tag data from one or more RFID tags present in the fitting room by transmitting a reading radio wave having directivity in an inner direction of the fitting room according to detection of the person entering the fitting room by the sensor, wherein the RFID reader includes:
        a specific-data storing unit configured to store specific tag data of a specific RFID tag; and
        a control unit configured to transmit, in response to a determination that tag data coinciding with the specific tag data stored in the specific-data storing unit is not included in any of the tag data read from the one or more RFID tags present in the fitting room, all the tag data read from the one or more RFID tags to a host apparatus, and to prevent, in response to a determination that at least a subset of the tag data read from the one or more RFID tags coincides with the specific tag data stored in the specific-data storing unit, transmission of the tag data to the host apparatus and wait until a predetermined waiting time elapses before allowing the RFID reader to read subsequent tag data.

2. The RFID system according to claim 1, wherein
    at least one of the one or more RFID tags are attached to a commodity, and
    the specific tag data stored in the specific-data storing unit is identification information stored in the specific RFID tag associated with a store clerk.

3. A radio-frequency identification (RFID) system, comprising:
    a sensor configured to detect a person entering a fitting room;
    an RFID reader configured to read tag data from one or more RFID tags present in the fitting room by transmitting a reading radio wave having directivity in an inner direction of the fitting room according to detection of the person entering the fitting room by the sensor; and
    a server apparatus configured to receive the tag data read by the RFID reader, wherein
    the server apparatus includes:
        a read-data storing unit configured to store the tag data read by the RFID reader;
        a specific-data storing unit configured to store specific tag data stored in a specific RFID tag; and
        a control unit configured to store, in response to a determination that the tag data read by the RFID reader does not include the specific tag data stored in the specific-data storing unit, all the tag data in the read-data storing unit, and to prevent, in response to a determination that the tag data read by the RFID reader includes the specific tag data stored in the specific-data storing unit, storage of the tag data in the read-data storing unit and prevent the RFID reader from reading subsequent tag data until a predetermined waiting time elapses.

4. The RFID system according to claim 3, wherein
    at least one of the one or more RFID tags is attached to a commodity, and
    the specific tag data stored in the specific-data storing unit is identification information stored in an RFID tag associated with a store clerk.

5. A radio-frequency identification (RFID) tag reading method using a sensor configured to detect a person entering a fitting room, an RFID reader configured to read tag data from one or more RFID tags present in the fitting room by transmitting a reading radio wave having directivity in an inner direction of the fitting room, a read-data storing unit configured to store the tag data read by the RFID reader, and a specific-data storing unit configured to store specific tag data of a specific RFID tag, the method comprising:
    detecting the person entering the fitting room with the sensor;
    reading tag data from the one or more RFID tags present in the fitting room with the RFID reader in response to detection of the person entering the fitting room by the sensor;
    determining whether the tag data read from the one or more RFID tags includes the specific tag data stored in the specific-data storing unit;
    storing, in response to a determination that the tag data read by the RFID reader does not include the specific tag data stored in the specific-data storing unit; and
    preventing, in response to a determination that at least a portion of the tag data read by the RFID reader matches the specific tag data stored in the specific-data storing unit, storage of the tag data read by the RFID reader in the read-data storing unit and waiting a predetermined amount of time before reading subsequent tag data with the RFID reader.

6. The RFID tag reading method according to claim 5, wherein
at least one of the one or more RFID tags are attached to a commodity, and
the specific tag data stored in the specific-data storing unit represents identification information stored in an RFID tag corresponding to a store clerk.

* * * * *